United States Patent
Patterson et al.

(10) Patent No.: US 6,605,877 B1
(45) Date of Patent: Aug. 12, 2003

(54) RESTRAINT SYSTEM INTERFACE ARRANGEMENT FOR A SEAT BELT TENSION SENSOR

(75) Inventors: James F. Patterson, Greentown, IN (US); Charles A. Gray, Noblesville, IN (US); Robert K. Constable, Kokomo, IN (US); Stuart S. Sullivan, Peru, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/082,419

(22) Filed: Feb. 26, 2002

(51) Int. Cl.[7] .................................................. B60L 1/00
(52) U.S. Cl. ......................... 307/10.1; 307/9.1; 307/121
(58) Field of Search .............................. 307/5.1, 10.1, 307/121; 280/728.1, 735, 748, 801.1, 803–808, 734; 180/268, 271, 273; 340/457.1, 425.5, 667–669, 438; 200/61.586, 61.18, 85 A; 701/36, 45, 46, 47, 43; 257/480

(56) References Cited

U.S. PATENT DOCUMENTS

| | | | | |
|---|---|---|---|---|
| 4,695,823 A | * | 9/1987 | Vernon | 340/447 |
| 5,793,754 A | * | 8/1998 | Houldsworth et al. | 370/276 |
| 6,046,511 A | * | 4/2000 | Kincaid | 307/10.1 |
| 6,081,044 A | * | 6/2000 | Anthofer et al. | 307/10.1 |
| 6,101,436 A | * | 8/2000 | Fortune et al. | 701/45 |
| 6,320,494 B1 | * | 11/2001 | Bartels et al. | 340/310.01 |
| 6,481,750 B1 | * | 11/2002 | Kalina et al. | 280/801.1 |

* cited by examiner

*Primary Examiner*—Brian Sircus
*Assistant Examiner*—Robert Deberadinis
(74) *Attorney, Agent, or Firm*—Robert M. Sigler; Stefan V. Chmielewski

(57) ABSTRACT

An improved vehicle restraint system includes a seat belt tension sensor and an occupant detection control module for characterizing the occupant of a vehicle seat to determine whether to allow or suppress deployment of supplemental inflatable restraints for the occupant. The belt tension sensor includes on-board signal processing circuitry and is coupled to occupant detection control module via a two wire interface that both powers the sensor and its signal processing circuitry and supports communication of belt tension data to the occupant detection control module. The sensor produces an electrical signal responsive to seat belt tension, and the processing circuitry generates one of a specified number of messages pertaining to the range of the measured tension, and then modulates the current through the two wire interface to communicate the generated message to the occupant detection control module.

4 Claims, 6 Drawing Sheets

RESTRAINT SYSTEM INTERFACE ARRANGEMENT FOR A SEAT BELT TENSION SENSOR

TECHNICAL FIELD

This invention relates to a motor vehicle inflatable restraint system including a seat belt tension sensor for characterizing the occupant of a vehicle seat to determine whether to allow or suppress deployment of restraints for the occupant, and more particularly to a system arrangement for processing and communicating information provided by the seat belt tension sensor.

BACKGROUND OF THE INVENTION

Various occupant-responsive sensing devices can be employed to characterize the occupant of a vehicle seat for purposes of determining whether deployment of air bags and other restraints should be allowed or suppressed. For example, it is generally desired to allow normal deployment for an adult, to reduce deployment force for a child, and to suppress deployment entirely for an infant seat secured to the vehicle seat with a seat belt. A particularly effective and yet inexpensive way of achieving this functionality is to sense both the seat belt tension and the occupant weight applied to the bottom cushion of the seat. In general, the measured occupant weight may be reduced in proportion to the measured seat belt tension to be more reflective of the actual occupant weight applied to the seat, and seat belt tension in excess of a calibrated value is indicative of a cinched down infant seat.

SUMMARY OF THE INVENTION

The present invention is directed to an improved and cost effective mechanization of a vehicle restraint system including a seat belt tension sensor and an occupant detection module for characterizing the occupant of a vehicle seat to determine whether to allow or suppress deployment of supplemental inflatable restraints for the occupant. According to the invention, the belt tension sensor includes on-board signal processing circuitry and is coupled to occupant detection module via a two wire interface that both powers the sensor and its signal processing circuitry and supports communication of belt tension data to the occupant detection module. The sensor produces an electrical signal responsive to seat belt tension, and the processing circuitry generates one of a specified number of messages pertaining to the range of the measured tension, and then modulates a loop current in the two wire interface to communicate the generated message to the occupant detection module.

DESCRIPTION OF THE PREFERRED EMBODIMENT

Figure 1:
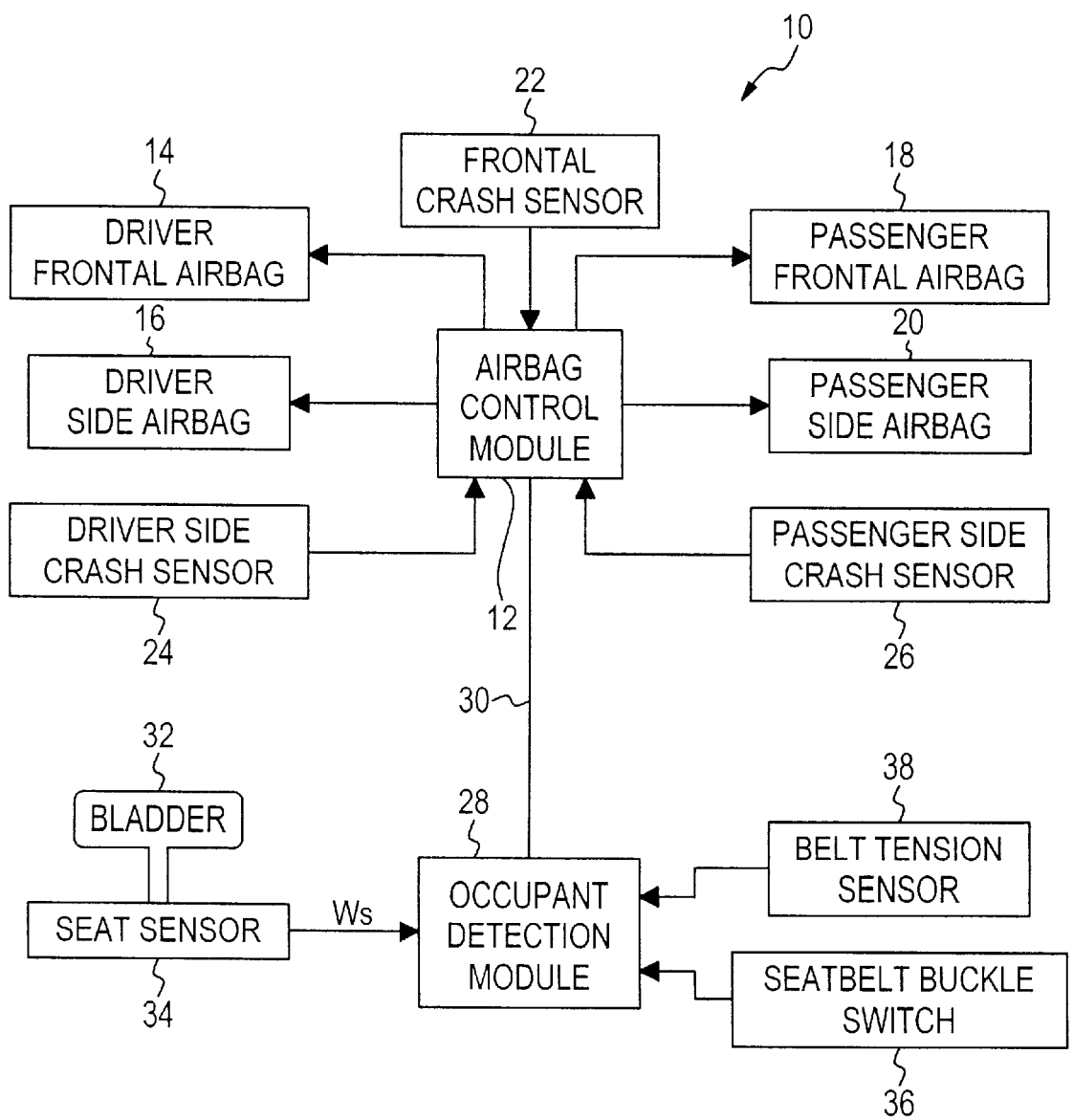
FIG. 1 is a system diagram of a vehicle restraint system, including a belt tension sensor and an occupant detection module according to this invention.

The present invention is disclosed in the context of a vehicle restraint system 10 including an airbag control module (ACM) 12, driver frontal and side air bags 14, 16, and passenger frontal and side airbags 18, 20. The ACM 12 determines whether and when to deploy the various airbags 14, 16, 18, 20 based on acceleration data obtained from a frontal crash sensor 22, a driver side crash sensor 24, a passenger side crash sensor 26, and occupant status information obtained from occupant detection module (ODM) 28. In general, the occupant status information may indicate simply whether to allow or suppress deployment, but in certain applications may provide additional occupant detail that enables ACM 12 to suitably control the deployment force of the respective air bags. The ODM 28 is responsive to the output Ws of a seat sensor 34 indicative of the occupant weight applied to a vehicle seat, a seat belt buckle switch 36 that indicates if a seat belt for the vehicle seat is buckled or unbuckled, and a belt tension sensor (BTS) 38 that indicates the amount of tension or force applied to the seat belt. As indicated in FIG. 1, the seat sensor 34 in the illustrated mechanization is a pressure sensor responsive to the fluid pressure in a seat cushion bladder 32, although other information such as the temperature of the cushion or bladder is usually required to obtain reliable occupant weight data over a wide range of ambient conditions; see for example, the U.S. Pat. Nos. 5,987,370, 6,101,436, 6,138,067 and 6,246,936, which are assigned to the assignee of the present invention and incorporated herein by reference.

Figure 2:
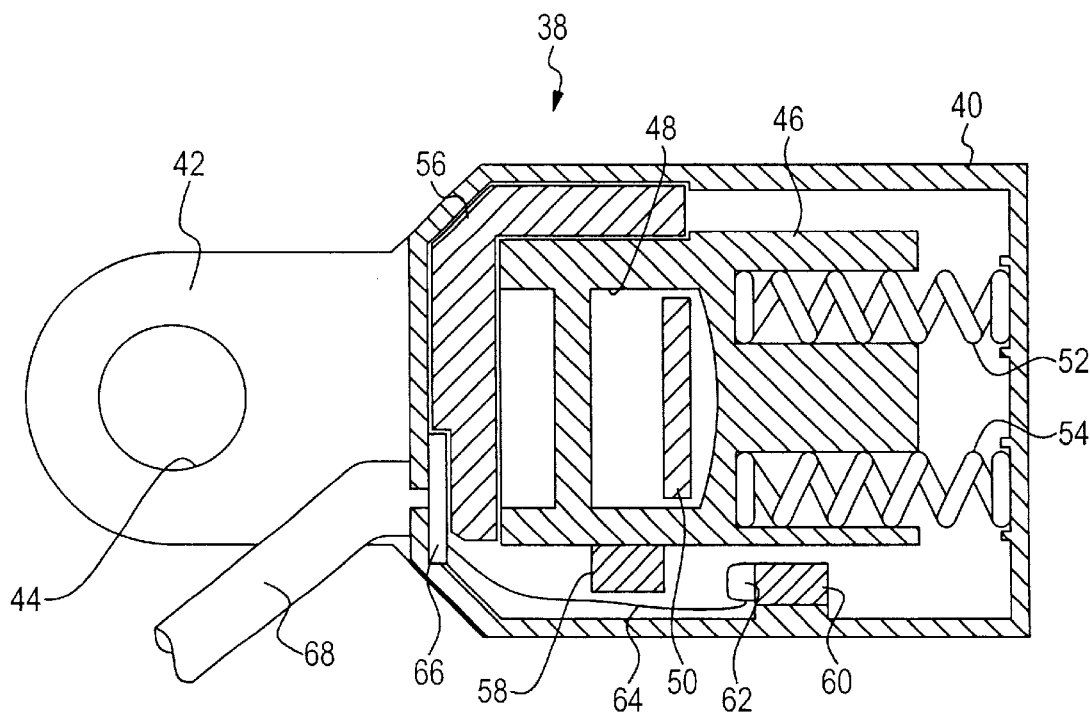
FIG. 2 is a partial cross-sectional view of the belt tension sensor of FIG. 1.

The BTS 38 may take various forms, as set forth, for example, in the Research Disclosure No. 41402, October, 1998, Page 1304, incorporated herein by reference. However, FIG. 2 illustrates a particularly advantageous mechanization in which BTS 38 is fastened to the vehicle floor outboard of the seat, and the seat belt 50 passes through a sensor slot 48. The slot 48 is formed in the main body of the sensor case 40, and the case 40 further includes a tang 42 with an opening 44 for fastening BTS 38 to the vehicle floor. When the seat belt 50 is in use, it engages an armature 46 supported within the case 40, and tension in the seat belt 50 biases armature 46 rightward as viewed in FIG. 2 against the bias force of springs 52 and 54. The rest position of armature 46 is defined by the stop 56, and rightward displacement of armature 46 is measured by a Hall Effect sensor 62 positioned between a magnet 58 affixed to the amature 46 and a magnet 60 affixed to the case 40. The sensor 62 produces an output signal that is indicative of magnetic field strength, and such signal is applied to a circuit board 66 via conductor 64. The circuit board 66 supports circuitry as described below in reference to FIG. 3 for processing the sensor output signal and communicating a belt tension message to ODM 28 via a conductor pair sheathed in the cable 68.

Figure 3:
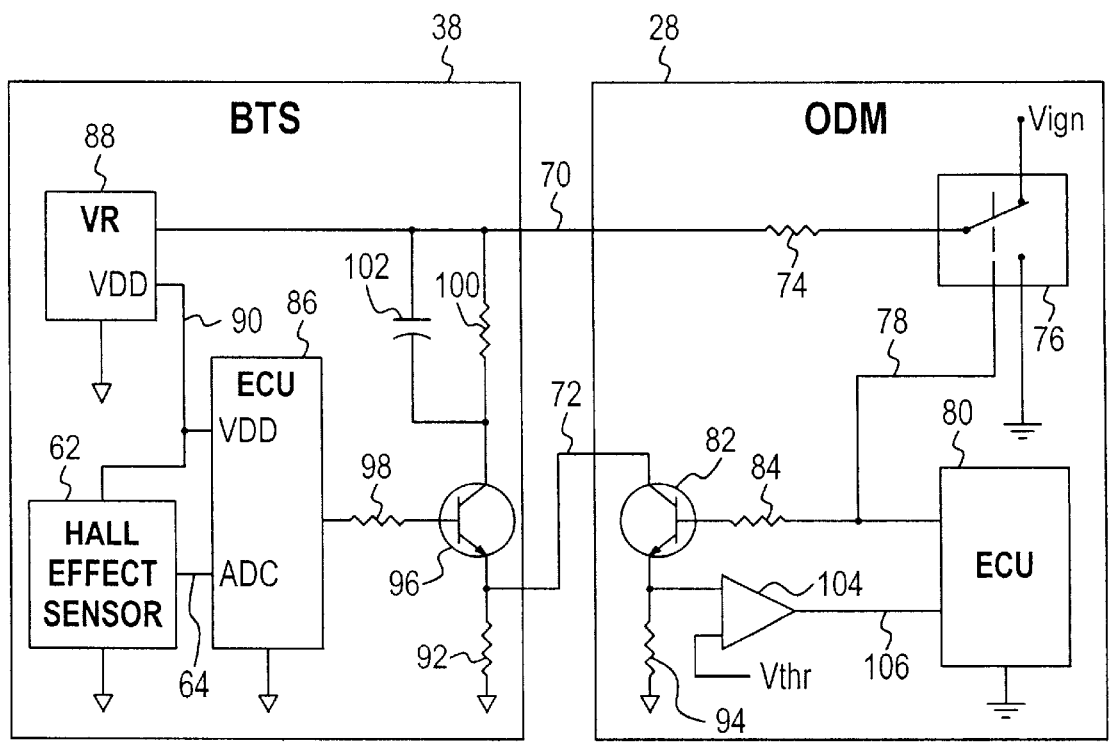
FIG. 3 is a circuit diagram illustrating pertinent circuitry of the belt tension sensor and occupant detection module of FIG. 1.

FIG. 3 depicts the circuits of BTS 38 and ODM 28 in block diagram format. The two wire interface comprising the conductors 70 and 72 is used both for supplying power from ODM 28 to BTS 38 and for communicating belt tension messages from BTS 38 to ODM 28. Within ODM 28, the conductor 70 is coupled to the vehicle ignition voltage Vign (typically 12VDC) through a current limiting resistor 74 and a switch 76 that opens or closes in response to the signal on control line 78. The control line 78 is selectively activated by a microprocessor-based ECU 80, which also activates a transistor 82 via resistor 84 whenever the control line 78 is activated to close the switch 76. Within BTS 38, the sensor output signal on line 64 is applied as an input to the analog-to-digital converter (ADC) input port of a microprocessor-based ECU 86, and the conductor 70 is supplied as an input to a voltage regulator (VR) 88 that supplies a regulated output voltage VDD (such as 5VDC) to Hall Effect Sensor 62 and ECU 86 via line 90. A ground or reference voltage is supplied from ODM 28 to BTS 38 via conductor 72, the transistor 82 and the resistors 92 and 94. Thus, operating power is supplied to BTS 38 from ODM 28 when ECU 80 activates the control line 78.

Figure 4:
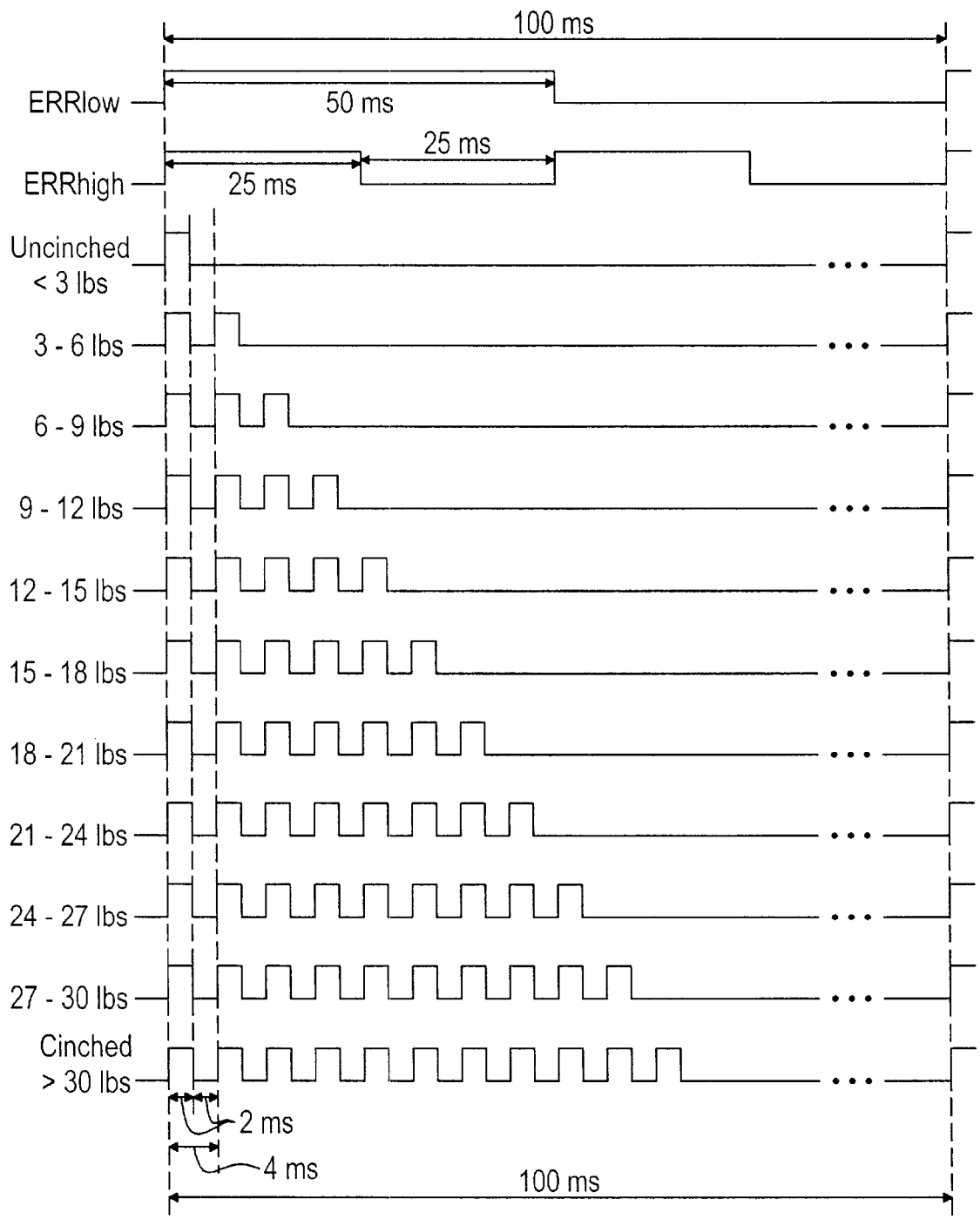
FIG. 4 is a timing diagram illustrating a communication protocol for sending messages from the belt tension sensor to the occupant detection module.

As more fully described below in reference to FIG. 7, the ECU 86 creates a digital representation of the sensor output signal, and determines a corresponding belt tension range. In the illustrated embodiment, for example, there are eleven legitimate belt tension ranges (0–3 lbs., 3–6 lbs., 6–9 lbs., 9–12 lbs., 12–15 lbs., 15–18 lbs., 18–21 lbs., 21–24 lbs., 24–27 lbs., 27–30 lbs., and over-30 lbs.), a failed low range (ERRlow) and a failed high range (ERRhigh). A message indicative of the determined belt tension range is then communicated to ODM 28 by modulating the conduction of a transistor 96 via resistor 98 in accordance with the timing diagram of FIG. 4. Each modulation pattern has a fixed period such as 100 msec, with a different number of pulses and/or pulse-widths occurring within the period. For example, a series of five two-msec pulses is used to represent the belt tension range of 12–15 lbs. The emitter of transistor 96 is coupled to the conductor 72, while the collector of transistor 96 is coupled to conductor 70 via the parallel connected resistor 100 and capacitor 102. When the transistor 96 is modulated to a conductive state, the voltage on conductor 70 falls to a value determined by the resistors 74, 100, 92 and 94 (which is still higher than the VDD output of voltage regulator 88), and the loop current in conductors 70 and 72 increases to a higher-than-normal value. This change in the loop current is detected by the comparator 104 in ODM 28, which compares the voltage across resistor 94 to a threshold Vthr to produce a digital output signal on line 106 that is supplied as an input to the ECU 80.

As described below, the ECU 80 decodes the belt tension message transmitted by BTS 38, and uses the corresponding belt tension range to determine if airbag deployment should be allowed or suppressed. If the belt tension range is indicative of a cinched infant seat (i.e., above a calibrated value such as 30 lbs.), the occupant status is set to SUPPRESS to suppress airbag deployment. Otherwise the belt tension range is used to compensate the measured seat weight Ws, or to inform ACM 12 of a failure of BTS 38.

Figure 5:
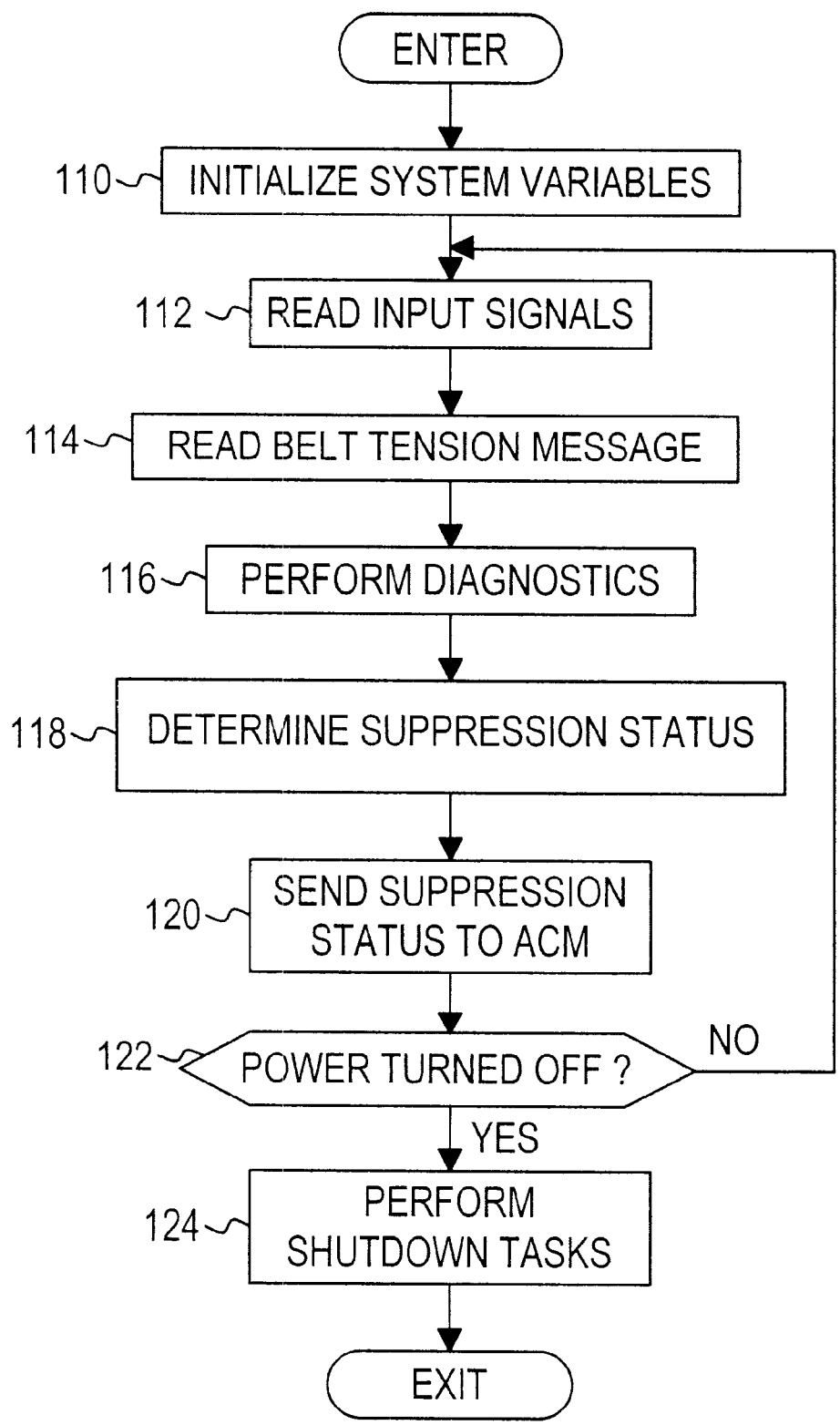
FIGS. 5 and 6 depict flow diagrams representative of software routines executed by the occupant detection module of FIG. 1 according to this invention.
Figure 6:
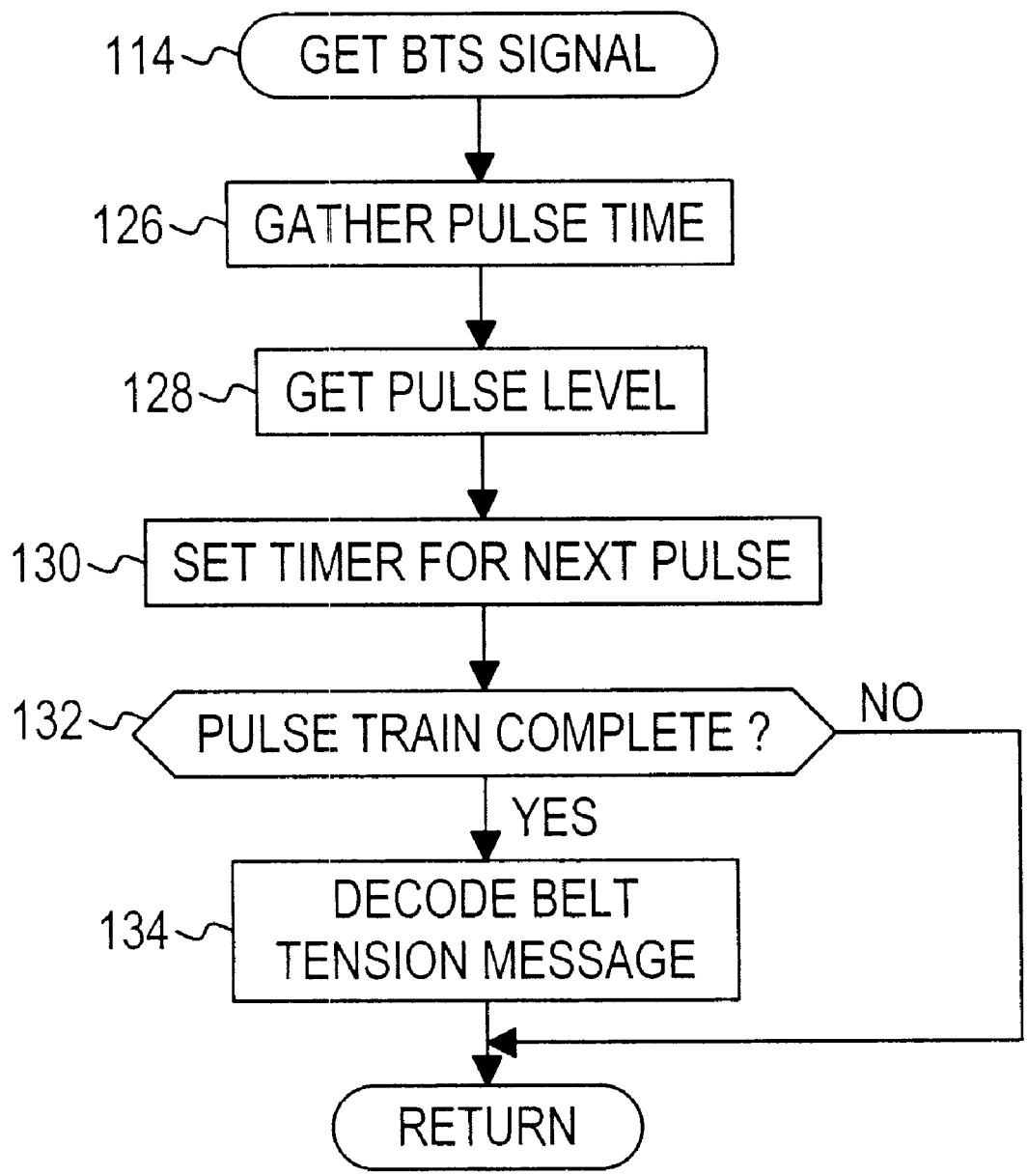

The flow diagrams of FIGS. 5–6 represent software routines executed by the ECU 80 of ODM 28 according to this invention. The routine of FIG. 5 is continuously executed during vehicle operation to update the suppression status based on the various inputs depicted in FIG. 1, and to send the suppression status to ACM 12, whereas the routine of FIG. 6 is an interrupt service routine executed in response to a logic level transition on the comparator output line 106 for receiving and decoding the belt tension message sent by BTS 38.

Referring to FIG. 5, the block 110 is initially executed to initialize system variables including the suppression status. Then the blocks 112 and 114 are executed to read various input signals such as the measured seat weight Ws and the seat belt buckle switch state, and to read the current belt tension range. The diagnostics block 116 determines if the input signals are consistent and within normal ranges, and the block 118 then determines the suppression status based on the measured seat weight, the seat belt buckle state and the seat belt tension range. For example, the belt tension range can be used to detect the presence of a cinched down infant seat, or to compensate the measured set weight Ws so that it more accurately represents occupant weight. If an infant seat is detected, the suppression status is set to SUPPRESS; otherwise the suppression status is set to either SUPPRESS or ALLOW depending on the magnitude of the adjusted seat weight and the seat belt buckle switch state. The block 120 then sends the suppression status to ACM 12, and possibly also to a driver display (not shown). As indicated at block 122, the blocks 112–120 are repeatedly executed during vehicle operation, and when the vehicle ignition switch is turned off the block 114 performs shut-down tasks to complete the routine.

As indicated above, the interrupt service routine of FIG. 6 is executed in response to a logic level transition on the comparator output line 106. The blocks 126 and 128 determine the pulse time and level, and the block 130 sets a timer to measure the duration of the next pulse. This process is repeated at each interrupt until block 132 determines that the message pulse train is complete. At such point, the block 134 is executed to decode the belt tension message based on the number of pulses and their duration.

Figure 7:
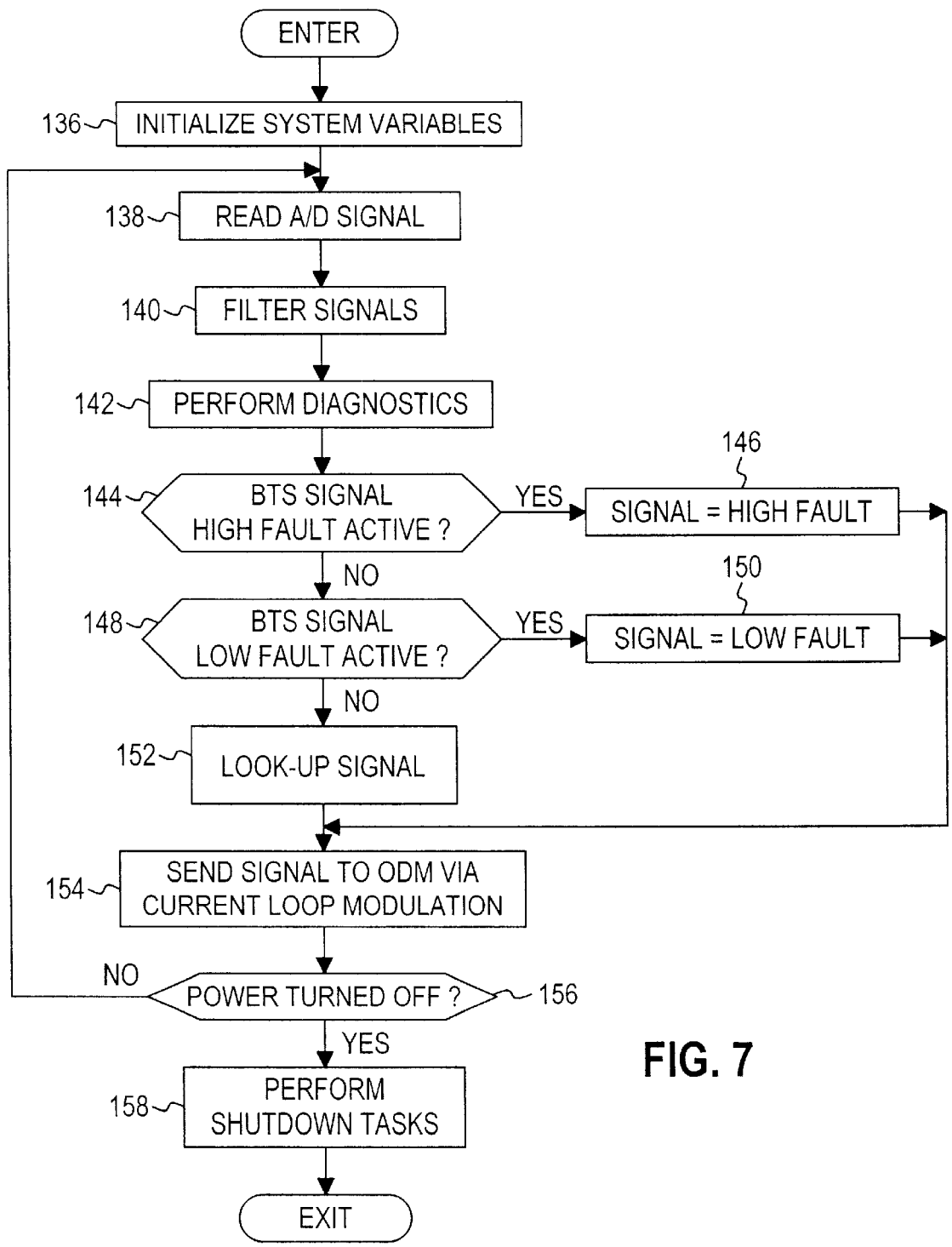
FIG. 7 depicts a flow diagram representative of a software routine executed by the belt tension sensor circuit of FIG. 3 according to this invention.

The flow diagram of FIG. 7 represents a software routine executed during vehicle operation by the ECU 86 of BTS 38 for processing the output signal of Hall Effect sensor 62, and sending a corresponding belt tension range message to ODM 28. The block 136 is initially executed to initialize system variables including the belt tension range. Then the blocks 138 and 140 are executed to read and filter the digital version of the Hall Effect output signal, and the block 142 determines if the signal is within a normal range of vales. If the diagnostics indicate that the signal is above the normal range, the blocks 144 and 146 set the belt tension range signal (SIGNAL) to HIGH FAULT; if the signal is below the normal range, the blocks 148 and 150 set SIGNAL to LOW FAULT. Otherwise, the block 152 sets SIGNAL to a value corresponding to the measured belt tension, either by table look-up or successive comparison of the filtered signal to a series of calibrated thresholds. Then the block 154 is executed to send the determined SIGNAL to ODM 28 by modulating the conduction of a transistor 96 as described above in reference to the block diagram of FIG. 3 and the timing diagram of FIG. 4. As indicated at block 156, the blocks 138–154 are repeatedly executed during vehicle operation, and when the vehicle ignition switch is turned off, the block 158 performs shutdown tasks to complete the routine.

In summary, the present invention provides a cost effective arrangement for interfacing a remote belt tension sensor to an occupant detection module in a vehicle restraint system. The two wire interface not only supplies power to from the occupant detection module to the sensor and its associated signal processing circuitry, but also supports communication of belt tension messages to the occupant detection module through modulation of the loop current in the two wire interlace. Functions customarily performed in the occupant detection module, such as signal processing and diagnostics, are instead performed by the sensor circuitry, and the belt tension data is transferred to the occupant detection module in a digital format to reduce susceptibility to error from spurious electromagnetic interference.

While this invention has been described in reference to the illustrated embodiment, it will of course be recognized that various modifications in addition to those mentioned above will occur to those skilled in the art. For example, the message protocol of FIG. 4 may be modified to include more or fewer ranges, the belt tension sensor 38 may be different than shown, and so on. Accordingly, it should be understood that restraint systems incorporating these and other modifications may fall within the scope of this invention, which is defined by the appended claims.

What is claimed is:

1. A restraint system for the occupant of a vehicle seat, including a sensor for measuring tension in a seat belt associated with said seat, and an occupant detection module for determining whether to allow or suppress deployment of restraints for the occupant based on measured parameters including the measured seat belt tension, the system further comprising:

first and second conductors coupling said occupant detection module to said sensor;

sensor circuitry including a first transistor coupled between said first and second conductors, and a first controller for characterizing an output signal of the sensor relative to the determination of whether to allow of suppress deployment, and for modulating a conduction of said first transistor in accordance with such characterization; and occupant detection module circuitry including a controlled switch coupled to said first conductor, a second transistor coupled said second conductor, and a second controller for activating said controlled switch and said second transistor to couple said first and second conductors to a system voltage, for detecting a current of said second transistor, and for decoding the sensor output signal characterization based on the detected current.

2. The restraint system of claim 1, wherein:

the sensor circuitry includes a voltage regulator coupled to the first and second conductors for developing an operating voltage for said sensor and said sensor circuitry which is lower than said system voltage so that such operating voltage is not affected by the modulation of the conduction of said first transistor.

3. The restraint system of claim 1, wherein said first controller establishes a plurality of possible ranges of seat belt tension in terms of sensor output signal value and characterizes the sensor output signal based on the established ranges such that the modulation of said first transistor indicates an established range of seat belt tension within which the measured seat belt tension lies.

4. The restraint system of claim 3, wherein said first controller characterizes the sensor output signal such that the modulation of said first transistor indicates a failure of said sensor when the sensor output signal value is outside said plurality of possible ranges.

* * * * *